July 16, 1963
H. I. F. EVERNDEN
3,097,544
TRANSMISSION
Filed Sept. 15, 1961
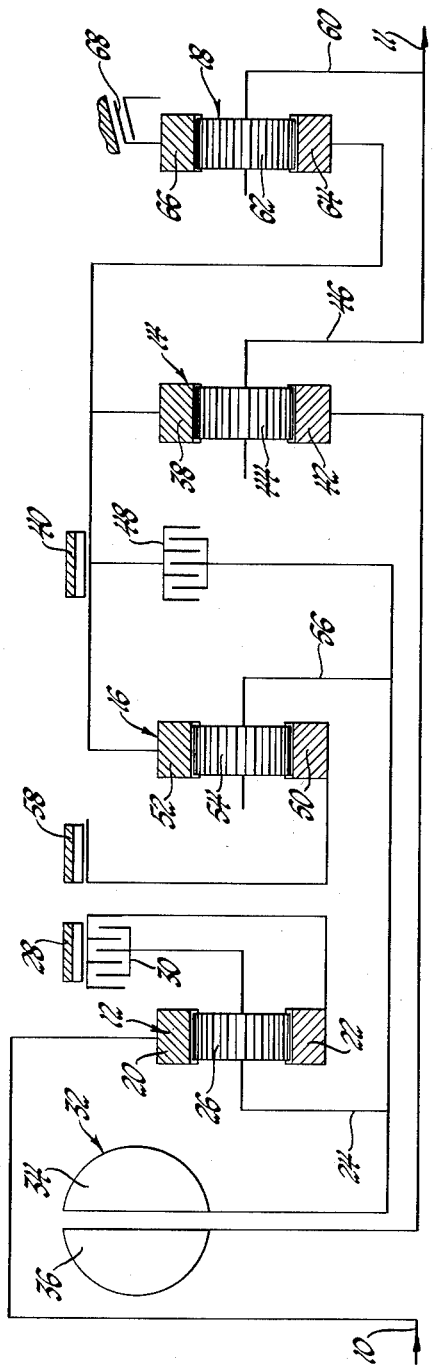
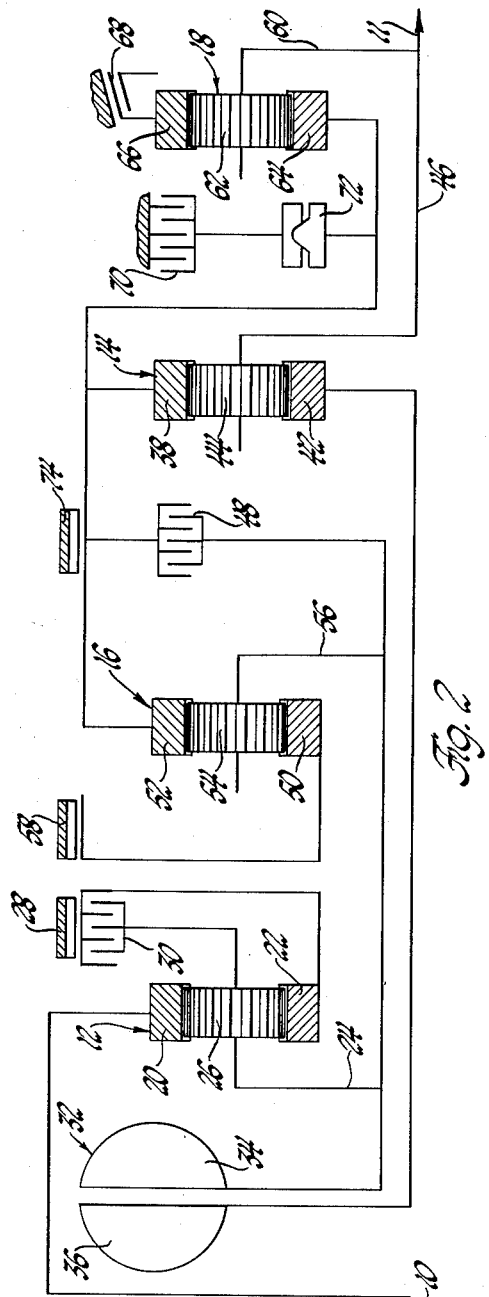
INVENTOR.
Harold I. F. Evernden
BY
Hugh L. Fisher
ATTORNEY

United States Patent Office 3,097,544
Patented July 16, 1963

3,097,544
TRANSMISSION
Harold Ivan F. Evernden, Wistaston, England, assignor to General Motors Corporation, Detroit, Mich., a corporation of Delaware
Filed Sept. 15, 1961, Ser. No. 138,461
Claims priority, application Great Britain Oct. 21, 1960
9 Claims. (Cl. 74—688)

This invention relates to improvements in power transmissions adapted, although not exclusively, for use with motor vehicles.

Frequently, it is wanted to augment the ratio coverage of a transmission by adding an overdrive. This as is well known can substantially enhance the economy of motor vehicle operation particularly when the highest transmission ratio is a direct one in which most of the driving is done. To provide the overdrive ratio, often an auxiliary overdrive transmission of the planetary gear type is added to the main transmission, but this arrangement has inherent disadvantages since such an auxiliary transmission would usually have to be conditioned for direct drive at all times when the overdrive ratio was not wanted and therefore would be required to handle the large low gear and reverse torques. Moreover, with planetary gearing, the overdrive ratio is more or less limited by the minimum size that the overdrive sun gear can be made, for it is usually impractical and undesirable to increase the outer diameter of the ring gear.

One possible way to avoid these problems is to use multiple and complex gearing arrangements. These arrangements are expensive and therefore unsatisfactory.

With these problems in mind, the invention contemplates a novel arrangement for incorporating an overdrive gear unit in a transmission so as to obtain a different overdrive ratio than that produced by the overdrive unit alone.

More specifically, the invention seeks to provide a unique way of combining an overdrive unit with the gearing in an existing transmission so as to provide a more advantageous overdrive ratio and without encountering any of the foregoing problems.

It is likewise an aim of the invention to provide a plural power path transmission with an overdrive unit in one of the paths and thereby render available a greater overdrive ratio than is attainable from the unit alone. This is accomplished without altering the basic dimensions of the overdrive gear unit and without requiring that the larger torques occurring in the lower drive ratios be handled by the unit at any time.

The foregoing and other objects and advantages of the invention will be apparent from the following description and the accompanying drawings in which:

FIGURE 1 is a schematic view of a transmission incorporating the principles of the invention; and FIGURE 2 is a schematic view of a modification of the FIGURE 1 transmission.

Referring first to the FIGURE 1 transmission, the numeral 10 denotes a power shaft that may be connected in a known way to a vehicle engine (not shown) and a load shaft 11 that is drive connected in any suitable way to the vehicle wheels. In between these two shafts 10 and 11 are drivingly interconnected a series of planetary gear units including a drive or torque dividing front gear unit 12, a drive or torque combining rear gear unit 14, and an overdrive gear unit 16. These three gear units 12, 14, and 16 offer, as will become apparent, at least six forward drive ratios. A reverse drive ratio is also provided by a reverse planetary gear unit 18.

Considering now the front planetary gear unit 12, this unit has a ring gear 20 connected directly to the power shaft 10 so as to perform as the input. A sun gear 22 functions as a reactor, and a planet carrier 24 serves as the output. One or more planet pinions 26 are journaled on the planet carrier 34 and intermesh with the ring and sun gears 20 and 22. In a way well known, restraint of rotation of the sun gear 22 by a brake 28 of the disk, ban, cone, or other suitable type will cause the output planet carrier 24 to be revolved in the same direction as the input ring gear 20 but at a reduced speed with respect thereto. To lock up the front gear unit 12 for a direct drive, a clutch 30 of any customary kind is interposed between the planet carrier 24 and the sun gear 22 so that when engaged the unit 12 will have no relative rotation between any of the members. The clutch 30 may be located between the ring and sun gears 20 and 22 or between the carrier 24 and the ring gear 20, the disposition being determined by desired shift characteristics as reflected by the amount of torque the clutch 30 must assume in order to prevent the relative motion between the clutched members of the unit 12.

From the front gear unit 12, the drive divides with part proceeding to a hydrodynamic torque transmitting device, as a coupling 32, and with another part going to the rear and overdrive units 14 and 16. The drive proceeding to the fluid coupling 32 will revolve an impeller 34, which will in turn and in a customary manner, cause a turbine 36 to be revolved through a fluid medium in the same direction. At the coupling point, both the impeller 34 and the turbine 36 will be revolving at substantially the same speed except for a certain amount of inherent slippage. The resultant fluid drive from the fluid coupling 32 is likewise transferred to the rear gear unit 14 so that in effect the rear gear unit 14, as will become apparent, receives both a mechanical drive and a fluid drive.

The rear gear unit 14 has a reaction ring gear 38 that can be restrained from rotation by a brake 40, which may be similar to the front unit brake 28, when an underdrive is wanted. An input sun gear 42 is connected directly to the fluid coupling turbine 36 and meshes along with the ring gear 38 with one or more planet pinions 44 journaled on an output planet carrier 46. The output planet carrier 46 transfers drive to the load shaft 11. A rear unit clutch 48 combines with the fluid coupling 32 to lock up the rear unit 14 for a unitary drive.

Directly in front of the rear unit clutch 48 is the overdrive unit 16 comprising a reaction sun gear 50, an output ring gear 52, one or more planet pinions 54 intermeshing with the gears 50 and 52, and a planet carrier 56 revolvably supporting the planet pinions 54. The overdrive unit carrier 56 is drive connected to the front gear unit planetary carrier 24; whereas the overdrive unit output ring gear 52 is connected to the rear unit ring gear 38. An overdrive ratio results when an overdrive brake 58 is engaged and prevents rotation of the reaction sun gear 50.

The reverse gear unit 18 has an output planet carrier 60 directly connected to the load shaft 11 and revolvably supports one or more planet pinions 62. These planet pinions 62 intermesh with an input sun gear 64 that is connected to the rear unit ring gear 38 and a reaction ring gear 66 restrained from rotation by a reverse brake 68, in this instance of the cone type, although other known kinds of brakes may be employed, such as mentioned relative to the front unit brake 28.

The various brakes and clutches employed in the FIGURE 1 transmission may be actuated in any known way, e.g., electrically, hydraulically, pneumatically, or by some mechanical provision and in a certain sequence. The sequence of operation will be described in the following operational summary.

The FIGURE 1 transmission, as has been mentioned, enables at least six different forward drive ratios and a reverse drive ratio to be attained. The first drive ratio, that is the one considered the lowest, produces the greatest torque multiplication and occurs when both the front and rear gear units 11 and 14 are conditioned for an underdrive. This demands that the front gear unit brake 28 and the rear gear unit brake 40 both be engaged to respectively prevent the front gear unit reaction sun gear 22 and the rear gear unit reaction ring gear 38 from reverse rotation. Then, with the power shaft 10 being driven forwardly, the front gear unit carrier 24 will be driven at a reduced speed relative to shaft 10. The drive from the carrier 24 will proceed via the fluid coupling 32 to the rear unit input sun gear 42. The rear unit output carrier 46 and accordingly the load shaft 11 will now be driven in a ratio determined by the product of the drive ratios from both the front and rear units 12 and 14. For example, if the front unit 12 provides a 1.45 ratio and the rear unit a 2.63 ratio, then the product will result in a 3.82 first drive ratio.

To establish second speed, the rear gear unit 14 retains its first drive ratio status, and the front gear unit 12 is changed by disengaging the brake 28 and engaging the clutch 30. Drive is still to the rear unit input sun gear 42 from the fluid coupling 32 but now the sun gear 42 is driven at substantially the same speed as the power shaft 10, due to the lock up of the front gear unit 12. Again, it is mentioned that a slight amount of slip in the fluid coupling 32 will cause the rear unit sun gear 42 to be revolved at a somewhat lesser speed than the power shaft 10. However, for all practical purposes, this can be considered the same. The ratio achieved is that from the rear gear unit only and can be the 2.63 ratio suggested in the example for description for the first speed drive.

The next ratio change is a so-called "double transition shift" in that the front and rear gear units 12 and 14 are completely reconditioned. In the front gear unit 12, the clutch 30 is disengaged and the brake 28 re-engaged so as to again afford an underdrive. The rear gear unit 14 will be altered for a direct drive by the disengagement of the brake 40 and the engagement of the clutch 48. A split torque drive results from arrangement with the drive from the front gear unit output carrier 24 proceeding via two power paths, one through the fluid coupling 32 and to the rear unit input sun gear 42 and the other through the clutch 48 to the rear gear unit reaction ring gear 38. With the exception of the mentioned slip through the fluid coupling 32, the rear unit ring and sun gears 38 and 42 will be revolved at substantially the same speed so that the rear gear unit 14 can be considered locked up in the third drive ratio. Accordingly, the speed at which the load shaft 11 is driven is determined entirely by the front gear unit 12.

The split torque arrangement is advantageous since the influence of the fluid coupling slippage in the higher drive ratios on the over-all transmission efficiency is reduced because only a portion of the drive is through the fluid coupling 32. Additionally, the fluid coupling 32 permits a fluid start to be made and absorbs drive line shocks.

In the fourth drive ratio, the overdrive gear unit 16 replaces the rear unit clutch 48 in the drive train between the front unit carrier 24 and the rear unit reaction ring gear 38, the third drive ratio split drive still being effective. Therefore, the rear unit clutch 48 is disengaged and the overdrive brake 58 engaged. Since the overdrive unit carrier 56 is always connected to the front unit planet carrier 24, the overdrive unit ring gear 52 will drive the rear unit ring gear 38 at a faster speed than that at which the front unit carrier 24 is being driven and also, faster than the speed at which the rear unit input sun gear 42 is being propelled. The result will be a slightly different ratio than that in the third drive ratio due to the combining effect from the rear gear unit 14. The actual ratio will be determined by ratios from the front gear unit 12 and the overdrive unit 16 and the proportions of the rear gear unit 14. It is, however, preferable, if the fourth drive ratio is wanted, that the ratio be somewhere between a direct drive and that achieved with the front gear unit 12 alone.

The fifth drive ratio is a direct drive and requires that the front unit clutch 30 be engaged and also the rear unit clutch 48. The brakes 28, 58, and 40 are disengaged. Consequently, drive from the locked up front unit 12 is still split as in the third and fourth drive ratios, the fluid portion proceeding via the fluid coupling 32 to the rear unit sun gear 42 and the mechanical portion via the rear unit clutch 48 to the rear unit ring gear 38, whereupon the rear unit carrier 60 and therefore the load shaft 12 are driven at substantially the same speed as the power shaft 10.

The final or sixth drive ratio merely requires as in fourth drive ratio, that the rear unit clutch 48 be disengaged and the overdrive brake 58 engaged. Since the front gear unit 12 is conditioned for a direct drive, part of the drive, i.e., the mechanical part, will proceed via the overdrive gear unit 16 and to the rear unit ring gear 38; whereas the other part of the drive goes through the fluid coupling 32 and to the rear unit sun gear 42. The overspeeding of the rear unit ring gear 38 relative to the speed of the sun gear 42 will produce a slightly higher ratio than that achieved from the overdrive gear unit 16 separately. The amount greater will be determined by the proportions of the rear gear unit 14.

To explain how the higher ratio is produced, consider the overdrive gear unit 16 individually, and that the ring gear 52 has twice as many teeth as the sun gear 50. This will result in an overdrive ratio of .66. In other words, the ring gear 52 will be making one revolution while the input carrier 56 is turning .66 times. If this gear unit 16 was attached directly to the load shaft 11 between the rear gear unit 14 and the load shaft 11, it can be appreciated that the overdrive gear unit 16 would have to always be effective, i.e., in order to transfer drive from the rear gear unit 16 to the load shaft 11, it would have to be locked up until the overdrive was wanted to supplement the ratio coverage. Therefore, all of the first ratio torque and reverse ratio torque, which are maximum, would have to be handled by the overdrive unit 16. Moreover, if it was desired to increase the overdrive ratio without changing the outer diameter of the ring gear 52, then the sun gear diameter would have to be decreased. Shafting very often limits this further complicating the problem.

By installing the overdrive gear unit 16 in one of the plural paths, namely the path used for the higher ratios occurring when the drive is split, the overdrive gear unit 16 is not exposed to the torques in the first and second drive ratios. When utilized in this fashion even when the overdrive unit 16 is effective, only a portion of the torque is transferred therethrough. Moreover, the ratio from the overdrive gear unit 16 is increased without altering the size of the sun gear 50 or the ring gear 52.

Considering only the ratio attained by the overdrive gear unit 16 and the rear gear unit 14 together, it will be equivalent to $$\frac{1}{1+\frac{N_{50}}{N_{52}} \times \frac{N_{38}}{N_{38}+N_{42}}}$$

where $N_{50}$ equals the number of teeth on the overdrive sun gear 50; $N_{52}$ equals the number of teeth on the overdrive ring gear 52; $N_{38}$, the number of teeth on the rear unit ring gear 38; and $N_{42}$, the number of teeth on the rear unit sun gear 42. If tooth numbers are selected as follows: the overdrive ring gear 52, 60 teeth; the overdrive sun gear 50, 30 teeth; the rear unit ring gear 38, 67 teeth; and the rear unit sun gear 42, 41 teeth; it will be noted that the basic ratio of the overdrive gear unit 16 alone will be .66, but the final ratio resulting from joining the overdrive gear unit 16 with the rear gear unit 14 will produce a ratio of .77.

The reverse drive ratio requires that the front gear unit 12 be conditioned for an underdrive and hence, the brake 28 is engaged. Also, the reverse brake 68 is engaged. Consequently, drive in a forward direction proceeds through the fluid coupling 32 to the rear unit sun gear 42. Since the rear unit ring gear 38 is unrestrained from rotation, it will be driven backwards and carry therewith the reverse gear unit sun gear 64. Rearward rotation of the reverse sun gear 64 will, due to the restraint from forward rotation of the reverse ring gear 66 by the reverse brake 68 cause the reverse unit carrier 60 to be revolved rearwardly and drive the load shaft 11 backwards in a ratio determined by that from the gear units involved in this drive.

The FIGURE 2 modification is the same as the FIGURE 1 transmission except for a forward brake 70. Consequently, the FIGURE 1 numerals apply to the FIGURE 2 transmission. The forward drive brake 70 includes a one-way device 72 of a character utilizing sprags, rollers, or other type one-way elements to prevent in one direction relative rotation between two races, one of which is grounded by the brake 70, and the other of which is secured to the rear unit ring gear 38. The forward drive brake 70 in operation prevents the rear unit ring gear 38 from revolving backwards and therefore provides the underdrive ratio needed in first and second speed. When the rear unit clutch 48 is engaged or the overdrive gear unit 16 is effective, the ring gear 38 is of course driven forwardly and this will be permitted by the one-way device 72.

Since the one-way device 72 does unlock when the rear unit ring gear 38 is driven forwardly, provision may be required for coast braking, for the drive when proceeding from the wheels via the load shaft 11 will cause the ring gear 38 to revolve forwardly. This causes the connection between the load shaft 11 and the power shaft 10 to be interrupted so that the readily available braking from the engine cannot be used. To avoid this, an overrun brake 74 may be incorporated in the transmission to prevent rotation of the ring gear 38 in either direction whenever engine or coast braking is wanted. The brake 74 will only be required to handle overrun torque, which is a small proportion of the torque demanded to be resisted by the brake 40 in the FIGURE 1 transmsision and hence, this brake 74 can be made substantially smaller.

The advantages of the foregoing transmissions and the overdrive arrangement are pronounced as can now be appreciated. Not only are size and capacity of the overdrive unit not serious factors, but a substantially larger overdrive ratio can be achieved thereby increasing the versatility of the transmission. Since the overdrive gear unit 16 is incorporated in one of the plural power paths, at no time does all of the available torque proceed therethrough.

The invention is to be limited only by the following claims.

I claim:

1. In a power transmission, the combination of a power source, a load, a plurality of gear units transferring drive from the power source to the load in a series of drive ratios, the plurality of gear units including a drive dividing gear unit drive connected to the power source, a drive combining gear unit drive connected to the load, and an overdrive gear unit having a predetermined overdrive ratio, plural power paths between the drive dividing and drive combining gear units, and a hydrodynamic torque transmitting device arranged in one of the paths, the overdrive gear unit being arranged in another of the power paths so as to cause the load to be overdriven in a ratio different from the predetermined ratio provided by the overdrive gear unit alone.

2. In a power transmission, the combination of a power source, a load, a plurality of planetary gear units transferring drive between the power source and the load in a series of drive ratios, the planetary gear units including a drive dividing gear unit drive connected to the power source, a drive combining planetary gear unit drive connected to the load, and an overdrive gear unit having a predetermined overdrive ratio, plural power paths between the drive dividing and drive combining gear units, and clutch means arranged in one power path, the overdrive gear unit being arranged in another power path so as to cause the load to be overdriven in a ratio different from the predetermined ratio derived from the overdrive gear unit alone.

3. In a power transmission, the combination of a power source, a load, a first planetary gear unit having an input drive connected to the power source and an output, a second planetary gear unit having plural inputs and an output drive connected to the load, plural power paths extending between the first gear unit output and each of the second gear unit inputs, clutch means disposed in one of the power paths, and an overdrive gear unit arranged in another of the power paths so as to cause the load to be overdriven in a ratio different from that available from the overdrive gear unit alone.

4. In a power transmission, the combination of a power source, a load, a first planetary gear unit including an input drive connected to the source, a reactor, a brake therefor, and an output, a second planetary gear unit including an input, a reactor, a brake therefor, and an output drive connected to the load, clutch means interposed between the first gear unit output and the second gear unit input, and an overdrive gear unit having an input drive connected to the first gear unit output, a reactor, a brake therefore, an output drive connected to the second gear unit reactor so as to cause the load to be overdriven in a ratio different from that available from the overdrive gear unit alone.

5. In a power transmission, the combination of a power source, a load, a first planetary gear unit having an input drive connected to the power source, a reactor, a brake therefor, and an output, a second planetary gear unit including an input, a reactor, a brake therefor, and an output drive connected to the load, a hydrodynamic torque transmitting device disposed between the first gear unit output and the second gear unit input, and an overdrive gear unit including an input drive connected to the first gear unit output, a reactor, a brake therefor, and an output drive connected to the second gear unit reactor, the overdrive gear unit being operative to cause the load to be overdriven in a ratio different from the ratio provided by the overdrive gear unit alone when drive is proceeding both through the overdrive gear unit to the reactor of the second gear unit and also to the input of the second gear unit.

6. In a power transmission, the combination of power source, a load, a first planetary gear unit including an input element drive connected to the power source, a reaction element, and an output element, a secondary planetary gear unit including an input element, a reaction element, and an output element drive connected to the load, ratio establishing mechanism for each gear unit, the ratio establishing mechanism including a brake for holding the reaction element so as to provide one drive ratio therethrough and means including a clutch for causing two of the elements to be rotated substantially in unison so as to establish another drive ratio therethrough, a hydrodynamic torque transmitting device drive connecting the first gear unit output element and the second gear unit input element, an overdrive planetary gear unit including an input element drive connected to the first gear unit output element, a reaction element, an output element drive connected to the second gear unit reaction element, an overdrive brake holding the overdrive reaction element so that, with the first gear unit conditioned for one drive ratio the brake and the clutch for the second gear unit inoperative, the load is driven in a ratio determined by the portions of the drive delivered to the second gear unit reaction and input elements.

7. In a power transmission; the combination of a power source; a load; a first planetary gear unit including an input element drive connected to the power source, a reaction element, and an output element; a secondary planetary gear unit including an input element, a reaction element, and an output element drive connected to the load; ratio establishing mechanism for the first gear unit including a brake for holding the reaction element so as to establish one drive ratio therethrough and a clutch for joining two of the elements for establishing another drive ratio therethrough; ratio establishing mechanism for the secondary planetary gear unit including a one-way device for preventing rotation of the second gear unit reaction element in one direction to thereby establish one drive ratio therethrough, a clutch for causing two of the second gear unit elements to be joined so as to condition the second gear unit for another drive ratio; and a coast brake for preventing rotation of the second gear unit reaction element in either direction so as to furnish overrun braking; a hydrodynamic torque transmitting device interconnecting the first gear output element and the second gear unit input element; and an overdrive planetary gear unit including an input element drive connected to the first gear unit output element, an output element drive connected to the second gear unit reaction element, and an overdrive brake holding the overdrive reaction element so that, with the first planetary gear unit conditioned for one drive ratio and the clutch for the second planetary gear unit inoperative, the load is driven in a ratio determined by the portions of drive delivered to the second gear unit input and reaction elements respectively through the hydrodynamic torque transmitting device and the overdrive gear unit.

8. In a power transmission; the combination of a power source; a load; a first planetary gear unit including an input gear drive connected to the power source, a reaction gear, and an output planet carrier having a planet pinion journaled thereon so as to intermesh with the input and reaction gears; a second planetary gear unit comprising an input gear, a reaction gear, and an output planet carrier drive connected to the load and having a planet pinion journaled thereon so as to intermesh with the input and reaction gears; ratio changing mechanism for conditioning the first and second planetary gear units for different drive ratios; the ratio changing mechanism including a brake for holding the reaction gear so as to provide one drive ratio therethrough and means including clutch means for causing the gear unit to be locked up for a direct drive ratio; a hydrodynamic torque transmitting device drivingly interposed between the first planetary gear unit output carrier and the second planetary gear unit input gear; and an overdrive planetary gear unit including an input carrier drive connected to the first gear unit output carrier, a reaction gear, an output gear drive connected to the second gear unit reaction gear, the overdrive gear unit carrier having a planet pinion journaled thereon so as to intermesh with the reaction and output gears, and an overdrive brake holding the overdrive reaction gear so that with the first gear unit conditioned for one drive ratio and the second gear unit clutch means inoperative the load is driven in a ratio determined by the proportions of the drive delivered to the second gear unit input and reaction gears respectively by the hydrodynamic torque transmitting device and the overdrive gear unit.

9. In a power transmission; the combination of a power source; a load; a first planetary gear unit including a ring gear drive connected to the power source, a reaction sun gear, an output planet carrier having a planet pinion journaled thereon so as to intermesh with the ring and sun gears, a brake resisting rotation of the first gear unit sun gear in one direction so as to provide a reduced drive ratio therethrough, and a clutch joining together the first gear unit carrier and sun gear so as to provide a direct drive ratio therethrough; a second planetary gear unit including an input sun gear, a reaction ring gear, an output planet carrier drive connected to the load and having a planet pinion journaled thereon so as to intermesh with the second gear unit input sun and reaction ring gears, a brake preventing rotation of the second gear unit reaction ring gear in one direction so as to provide a reduced drive ratio therethrough, and a clutch joining the second gear unit reaction ring gear to the first gear unit output planet carrier; a fluid coupling drivingly interposed between the first gear unit output planet carrier and the second gear unit input sun gear; an overdrive planetary gear unit including an input planet carrier drive connected to the first gear unit output carrier, a reaction sun gear, an output ring gear drive connected to the second gear unit reaction ring gear, the overdrive planet carrier having a planet pinion journaled thereon so as to intermesh with the overdrive gear unit ring and sun gears, and an overdrive brake holding the overdrive gear unit reaction sun gear so that with the first gear unit conditioned for a direct drive the load is driven at a greater overdrive ratio than that obtained from the overdrive gear unit alone.

References Cited in the file of this patent
UNITED STATES PATENTS

| | | |
|---|---|---|
| 2,260,846 | Voytech | Oct. 28, 1941 |
| 2,372,734 | Orr | Apr. 3, 1945 |
| 2,380,927 | Conkle | Aug. 7, 1945 |
| 2,728,247 | Snyder | Dec. 27, 1955 |
| 2,799,184 | Miller | July 16, 1957 |
| 2,873,625 | Simpson | Feb. 17, 1959 |
| 2,911,853 | Sand | Nov. 10, 1959 |
| 2,947,199 | Doidge et al. | Aug. 2, 1960 |